(12) United States Patent
Rogers et al.

(10) Patent No.: US 7,290,738 B1
(45) Date of Patent: Nov. 6, 2007

(54) DUAL JET EMERGING LIFT AUGMENTATION SYSTEM FOR AIRFOILS AND HYDROFOILS

(75) Inventors: Ernest O. Rogers, Great Falls, VA (US); Robin D. Imber, Rockville, MD (US); Jane S. Abramson, Great Falls, VA (US); Martin J. Donnelly, Gaithersburg, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 359 days.

(21) Appl. No.: 10/975,120

(22) Filed: Oct. 28, 2004

(51) Int. Cl.
*B64C 3/00* (2006.01)
*B64C 21/04* (2006.01)
*B64C 5/00* (2006.01)
*B64C 13/16* (2006.01)

(52) U.S. Cl. .................. 244/207; 244/198; 244/203; 416/914

(58) Field of Classification Search ............. 244/198, 244/199.1, 200, 200.1, 207, 208; 416/914, 416/90 R
See application file for complete search history.

(56) References Cited

U.S. PATENT DOCUMENTS

| | | | | |
|---|---|---|---|---|
| 2,873,233 | A * | 2/1959 | Schnable | 205/211 |
| 2,885,160 | A * | 5/1959 | Griswold, II | 244/207 |
| 2,939,650 | A * | 6/1960 | Coanda | 244/208 |
| 2,946,540 | A * | 7/1960 | Coanda | 244/15 |
| 3,062,483 | A * | 11/1962 | Davidson | 244/207 |
| 3,066,894 | A * | 12/1962 | Davidson | 244/76 R |
| 3,229,458 | A * | 1/1966 | Lang | 416/6 |
| 3,669,386 | A * | 6/1972 | Jacobs et al. | 244/52 |
| 3,670,994 | A * | 6/1972 | Kizilos | 244/207 |
| 3,752,401 | A * | 8/1973 | Kizilos | 239/265.35 |
| 3,830,450 | A * | 8/1974 | Williams et al. | 244/207 |
| 3,884,433 | A * | 5/1975 | Alexander | 244/207 |
| 4,457,480 | A * | 7/1984 | Englar et al. | 244/207 |
| 4,555,079 | A | 11/1985 | Harvell et al. | |
| 4,682,746 | A * | 7/1987 | Thomas | 244/207 |
| 5,464,321 | A * | 11/1995 | Williams et al. | 416/93 A |
| 5,727,381 | A * | 3/1998 | Rogers | 60/231 |
| 5,899,416 | A * | 5/1999 | Meister et al. | 244/207 |
| 6,109,566 | A * | 8/2000 | Miller et al. | 244/207 |
| 6,390,418 | B1 * | 5/2002 | McCormick et al. | 244/204 |

OTHER PUBLICATIONS

Rogers, Ernest O., Donnelly, Martin J., Abstract "Characteristics of a Dual-Slotted Circulation Control Wing of Low Aspect Ratio Intended for Naval Hydrodynamic Applications". AIAA 42nd Aerospace Sciences Meeting, Reno, NV 5-8 Jan. 2004.

* cited by examiner

*Primary Examiner*—Teri Pham Luu
*Assistant Examiner*—Joshua Michener
(74) *Attorney, Agent, or Firm*—Howard Kaiser; Jacob Shuster

(57) ABSTRACT

Separate upper and lower plenums within an aircraft airfoil or a sea hydrofoil conduct fluid under different pressures to nozzle slots from which jets emerge to augment lift in accordance with different travel conditions. Lift is induced by nozzle slot emergence of a primary jet from one of the plenums along a reverse flow path relative to secondary jet outflow from the other plenum. This capability involves angularly adjusted deflection of the primary jet outflow along forward, reverse or vertical directional flow paths from the trailing end of the airfoil or hydrofoil under zero and other different speed conditions by emergence of the secondary wall jet.

20 Claims, 2 Drawing Sheets

DUAL JET EMERGING LIFT AUGMENTATION SYSTEM FOR AIRFOILS AND HYDROFOILS

The present invention relates generally to wing or hydrofoil lift augmentation by use of powered blowing jets.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Airfoil or hydrofoil lift augmentation by use of various arrangements of slot emerging jets are already well known in the art as disclosed for example in U.S. Pat. Nos. 2,885,160, 4,457,480 and 4,682,746. The condition of the emerging jets is characterized by the jet flow momentum coefficient, which is essentially the ratio of jet momentum to the flow momentum of the foil travel speed. Such emerging jet arrangements involve: (1) a Coanda-effect tangential wall jet suitable for lift augmentation in one operational mode under higher travel speed conditions where the jet momentum coefficient is of low to moderate value; or (2) a jet ejected from the foil trailing edge at an angle to produce a jet-flap operational mode especially suitable for lift augmentation at low speed where the available jet momentum coefficient is high; or (3) a directable nozzle for vectoring of jet reaction control forces at zero speed conditions. Each one of the foregoing three operational modes is limited in suitability for force augmentation to a single range of either available momentum coefficient or speed as referred to. It is therefore an important object of the present invention to provide for extended lift augmentation under all conditions of speed and/or available jet momentum coefficient by means of a single trailing edge wall jet configuration under selective switching between different operational modes to thereby extend lift augmentation under all speed conditions between zero and high speed for the airfoil or hydrofoil.

SUMMARY OF THE INVENTION

Pursuant to the present invention, an airfoil or hydrofoil of an aircraft or sea vessel is internally provided with two separate plenum chambers from which pressurized fluid may emerge as jets through trailing edge nozzle slots. The jets are selectively controlled so as to switch between different operational modes so that the most effective mode for lift augmentation is used depending on travel speed. Thus under higher travel speed conditions a single plenum is pressurized to cause emergence of a single primary wall jet which remains attached to the rounded Coanda trailing edge for some distance of turning angle, thereby increasing circulatory lift. Due to the speed of the vehicle the momentum coefficient in this mode is only low to moderate, thereby providing for satisfactory operation with only the single jet which performs primarily a boundary layer control function. As the speed is reduced thereby increasing the available jet momentum coefficient, the second plenum is also pressurized, but at a much lower level, so that the outflow from the secondary nozzle slot precludes detrimentally excessive turning of the primary slot outflow by permitting entry into a jet-flap mode of operation. In the jet-flap mode, the primary wall jet is forced by the secondary jet to leave the trailing edge while still with excess momentum and at an acceptable angle to the direction of travel. Under these low speed conditions, the augmented lift achieved in the jet-flap mode is superior to that which would be obtained in the single slot mode which suffers from the excessive jet turning angle at high values of jet momentum. At or very near zero vehicle speed, the merged primary and secondary jets provide maneuvering force control in any desired direction, including thrust reversal, by changing the relative pressure ratio between the two jets.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
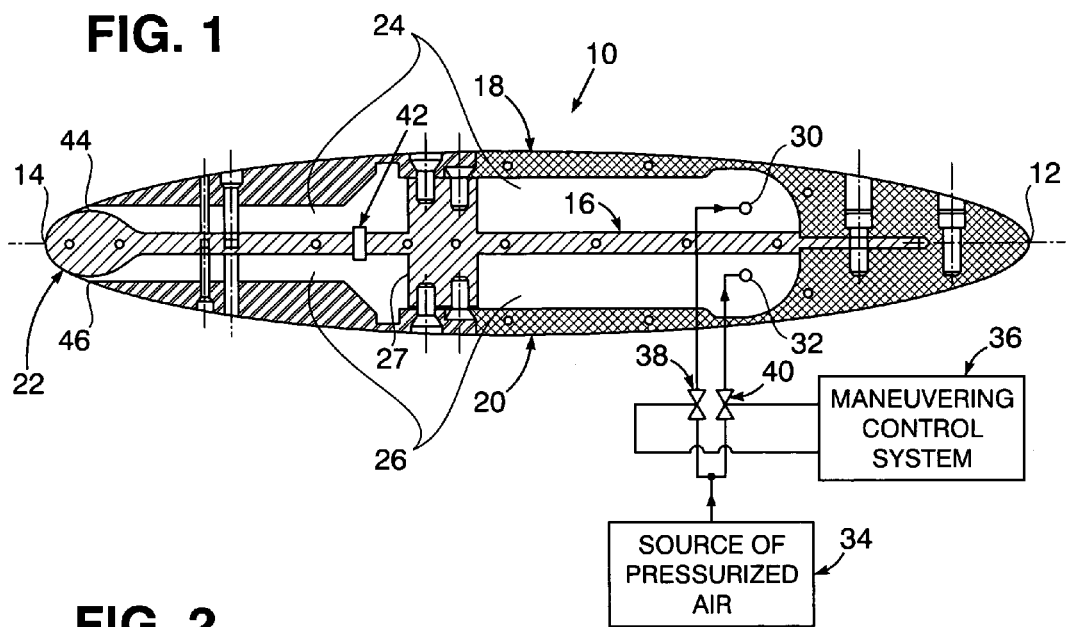
FIG. 1 is a cross-sectional view of an aircraft wing internally structured in accordance with one embodiment of the present invention, under control of a diagrammed system.

Referring now to the drawing in detail, FIG. 1 illustrates a cross-sectionally profiled fluid dynamic surface controlled airfoil wing 10 of an aircraft having a leading edge 12 and a trailing end 14. The cross-section profile of the wing 10 is not necessarily symmetrical. Internal structural support posts 27 interconnect an upper surface portion 18 and a lower surface portion 20 of the wing 10 with a support plate 16, which extends from the leading edge 12 toward a Coanda surface shaped formation 22 connected to the plate 16 at the trailing end 14. Upper and lower plenums 24 and 26 are separated from each other by extensions of the support plate 16 between the leading end 12 and the trailing end 14. Upper and lower fluid inlets 30 and 32 are formed adjacent the forward end of plenums 24 and 26, to which pressurized fluids from ambient operating media, such as air, is supplied. The air supplied to the inlets 30 and 32 is derived from a pressurized air source 34 under control of a maneuvering control system 36 through valves 38 and 40 according to one embodiment as diagrammed in FIG. 1.

According to another embodiment, a cross-bleed port 42 is positioned within the support plate 16 between the upper and lower plenums 24 and 26 for nozzle flow control purposes. The cross-bleed port 42 has an orifice through which a small portion of a singularly pressurized flow is metered between the plenums 24 and 26 to thereby delay excessive turning of a primary outflow jet from the upper plenum 24 under conditions of moderately high jet momentum coefficient. The port 42 may be utilized as a substitute for the valve 40, emplacing and activating secondary control of the system 36 in certain travel speed ranges, because the orifice of the port 42 is sized to prevent secondary jet outflow from the lower plenum 26 from being detrimental in any mode of operation while allowing sufficient beneficial flow.

As shown in FIG. 1, nozzle slots 44 and 46 are respectively established between the surface formation 22 and each of the upper and lower wing surface portions 18 and 20 at the trailing ends of the plenums 24 and 26. Outflow of pressurized fluid such as air as the primary and secondary nozzle jets from the wing 10 is thereby effected by emergence thereof from the nozzle slots 44 and 46 as hereinafter pointed out with respect to FIGS. 2A-2E, for aircraft maneuvering and control purposes at any speed including zero.

Figure 2:
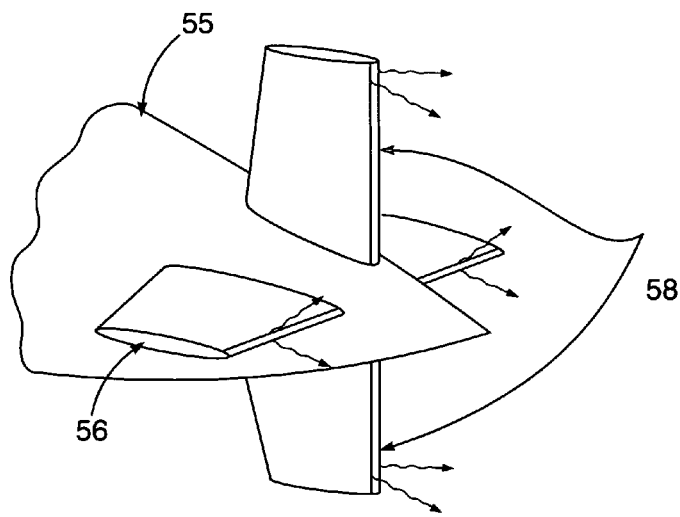
FIG. 2 is a partial perspective view illustration of a stem portion of the hull of a submerged seawater vessel, having hydrofoil planes and rudders positioned thereon with lift augmentation facilities as described with respect to FIG. 1.
Figure 2A:
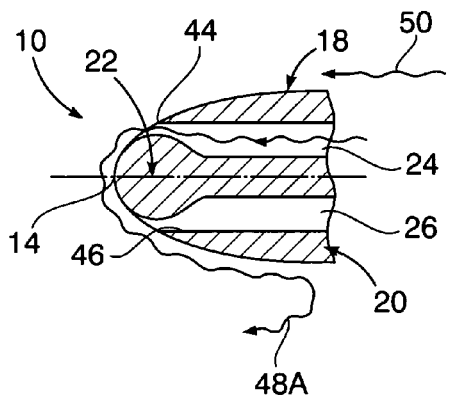
FIG. 2A is a partial section view of the trailing edge portion of the wing shown in FIG. 1, illustrating conditioned development of excessive wall jet turning onto opposite side surfaces.

Referring now to FIG. 2A, outflow of pressurized air confined to the upper plenum 24 emerges through the slot 44 as a jet 48A which turns about the trailing end 14 and excessively moves forward toward the leading end 12 during low speed travel of the aircraft because of the relatively low momentum of the oncoming external air flow 50 over all surfaces of the wing 10. Such jet 48A accordingly imposes local reduction in pressure that produces rearward drag on the wing 10 as well as to reduce its lift performance. Pursuant to the present invention, high momentum outflow from the slot 44 is controllably redirected by emergence of a low momentum secondary jet outflow from the lower plenum 26 through the slot 46, so as to prevent excessive turning of a resulting primary jet (48B) to thereby enhance wing Coanda lift performance. The lower level outflow from the slot 46 is achieved by controlling fluid pressurizations within the plenums 24 and 26 through the aforementioned maneuvering control system 36 according one embodiment diagrammed in FIG. 1. Alternate implementation to simplify the valving system according to another embodiment, is to provide the cross-bleed port 42, sufficing to always provide a portion of the secondary slot outflow suitable for certain non inclusive operating conditions.

Figure 2B:
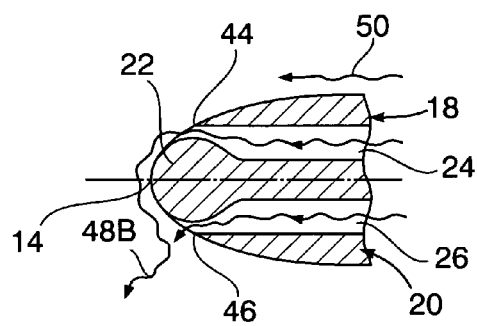
FIGS. 2B, 2C and 2D are partial section views corresponding to that of FIG. 2A, showing beneficial changes in behavior of the primary jet imposed by secondary outflow from the lower airfoil plenum.
Figure 2C:
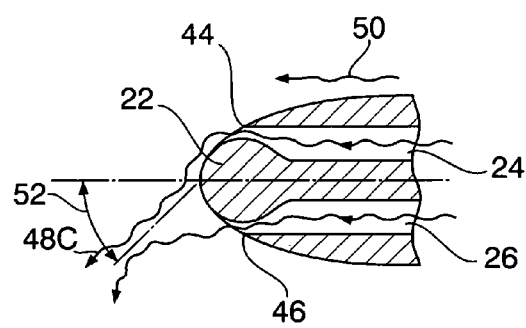

FIG. 2C illustrates conversion of the high flow rate of jet outflow from the slot 44 into a free jet 48C at a deflection angle 52 within a range of 30° to 90°, to provide a jet flap mode of operation for lift enhancement. The lower outflow momentum flux from the secondary slot 46 for this purpose is between 5% and 20% of the outflow momentum flux from the slot 44.

Figure 2D:
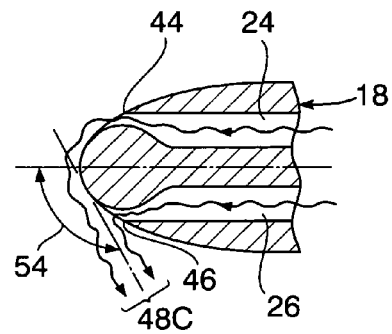

Directional control over thrust may also be provided for, under conditions of no oncoming flow or a zero transitional speed as illustrated in FIG. 2D, by controlled outflow from the slot 46 relative to the outflow from the slot 44 to produce a free planar jet 48C at any jet thrust angle 54 between 0° and +180° or −180°. Thus, the outflow from the slot 46 may also control the thrust angle 54 in a reverse direction under zero flight speed conditions pursuant to the present invention.

Figure 2E:
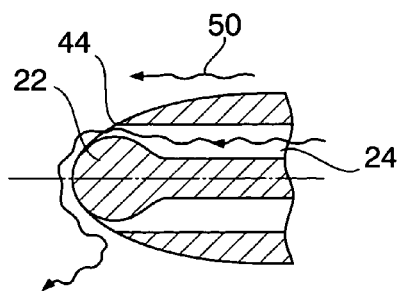
FIG. 2E is a partial section view of the trialing edge of the wing shown in FIG. 1, illustrating emergence of a primary jet from a single upper airfoil plenum.

Prior art arrangements do not use or recognize the benefit of a secondary slot flow to prevent the adverse effect of an excessively turned wall jet angle on a circulation control foil, as shown by contrast in FIG. 2A and FIG. 2B, with reference to FIG. 2E illustrating the desired flow path of the primary jet. Also the foregoing described operational modes involving primary and secondary outflows from the two slots 44 and 46 as illustrated in FIG. 2D, contrast sharply with prior art arrangements wherein static thrusting under zero speed with no oncoming flow 50 is limited to emergence of a jet in only one travel direction from a single slot. A jet providing forward thrust under zero speed conditions is produced by equal outflows from both of the slots 44 and 46, while an omni-directional thrust jet emerges from both of the slots 44 and 46 under the zero speed conditions at an angle determined by the ratio of pressures in the plenums 24 and 26.

The pressure control valves 38 and 40 are used to set the difference in pressure between the plenums 24 and 26, so as to selectively confine use of the jet emerging from the slot 46 as a control influence on the behavior of the other jet 48C emerging from the slot 44 as depicted in FIG. 2C. Changes between different optimized modes of operation is thereby effected, involving the captured wall jet 48B in a circulation control mode as shown in FIG. 2B and the jet 48C in the free planar jet mode as shown in FIG. 2C.

An optional arrangement of the present invention is to exclusively use only the control valve 38 and rely upon the cross-bleed port 42 as means to establish a fixed difference in pressure ratio between the plenums 24 and 26.

Figure 3:
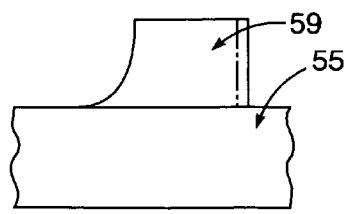
FIG. 3 is a partial side elevation view of the sail/conning tower portion of the seawater vessel hull in accordance with another embodiment of the present invention.

The aircraft wing configuration and operationally controlled emergence of jets therefrom as hereinbefore described with respect to aircraft, may be applied to the control surfaces of other types of fluid propelled vehicles such as a stern end hull portion 55 of a submerged seawater vessel as shown in FIG. 2. Thus, the configuration heretofore described for the airfoil wing 10 may be utilized to form a pair of all moveable or fixed horizontal hydrofoils 56 extending laterally from the vessel hull portion 55 at right angles to a pair of all moveable and/or fixed hydrofoil rudders 58 or to a sail/conning tower 59 extending from the hull portion 55 as shown in FIG. 3. The different previously described embodiments of the present invention are applicable hereto for enhancing Coanda or circulation control and maneuvering of such as the submerged vessel as well as to other vehicles such as surface ships.

Obviously, other modifications and variations of the present invention may be possible in light of the foregoing teachings. It is therefore to be understood that within the scope of the appended claims the invention may be practiced otherwise than as specifically described.

What is claimed is:

1. An apparatus for use in association with a fluid foil having a pair of opposite foil surface sections, a pair of opposite foil edges, a chamber bounded by said opposite foil surface sections, and a gap between respective ends of said opposite foil sections, said opposite foil surface sections being a first foil surface section and a second foil surface section, said opposite foil edges being a leading foil edge and a trailing foil edge, said gap extending along at least a portion of said trailing foil edge and communicating with said chamber, the apparatus comprising a structure and at least one support member, said structure including a flat partition section and a bulbous edge section, said at least one support member associating said foil surface sections and said structure, said flat partition section defining a geometric plane and being characterized by a thickness perpendicular to said geometric plane and by a cross-bleed conduit extending through said thickness at a location between said trailing foil edge and said at least one support member, said flat partition section and said bulbous edge section meeting at a junction defining a geometric line that lies in said geometric plane, said bulbous edge section being characterized by a cylindroid shape and by a diameter perpendicular to said geometric plane that is greater than said thickness, said geometric plane symmetrically dividing said cylindroid shape into two equivalent semi-cylindroid shapes on opposite sides of said geometric plane, said structure being situated in said chamber so that said bulbous edge section unsnugly fits in said gap and so that said geometric plane passes through said gap, said partition section dividing said chamber into a first plenum and a second plenum, two slots being formed that are parallel to said geometric plane and to each other, said slots being a first slot and a second slot, said first slot communicating with said first plenum and being demarcated by said first foil surface section and said bulbous edge section, said second slot communicating with said second plenum and being demarcated by said second foil surface section and said bulbous edge section, wherein when pressurized fluid is fed into said first plenum via an inlet provided in said first foil surface section, simultaneously a first portion of said pressurized fluid exits said first plenum through said first slot and a second portion of said pressurized fluid exits said second plenum through said second slot, said first portion of said pressurized fluid flowing unimpeded between said inlet and said first slot, said second portion of said pressurized fluid entering said second plenum through said cross-bleed conduit and flowing unimpeded between said cross-bleed conduit and said second slot, said cross-bleed port thereby determining said second portion of said pressurized fluid.

2. The apparatus for use in association with a fluid foil as recited in claim 1, wherein:
said first portion of said pressurized fluid is characterized by a first momentum flux upon exiting said first plenum through said first slot;
said second portion of said pressurized fluid is characterized by a second momentum flux upon exiting said second plenum through said second slot;
said second momentum flux is less than said first momentum flux.

3. The apparatus for use in association with a fluid foil as recited in claim 2, wherein:
said first portion of said pressurized fluid that has exited said first plenum through said first slot is to some degree entrained, in accordance with a Coanda effect, by said bulbous edge section, the entrained said first portion of said pressurized fluid thereby forming a fluid jet wall;
said second portion of said pressurized fluid that has exited said second plenum through said second slot influences the direction of said fluid jet wall.

4. The apparatus for use in association with a fluid foil as recited in claim 3, wherein:
said cross-bleed conduit is characterized by a fixed size; said fixed size is associated with a constant ratio of said second momentum flux to said first momentum flux; said constant ratio is no greater than 0.2; said constant ratio is independent of variation of said second momentum flux and said first momentum flux.

5. The apparatus for use in association with a fluid foil as recited in claim 4, wherein the influencing, by said second portion of said pressurized fluid, of the direction of said fluid jet wall, includes limitation of the degree to which said fluid jet wall is entrained by said bulbous edge section.

6. The apparatus for use in association with a fluid foil as recited in claim 3, wherein:
said cross-bleed conduit is characterized by a fixed size; said fixed size is associated with a constant ratio of said second momentum flux to said first momentum flux; said constant ratio is less than 0.05; said constant ratio is independent of variation of said second momentum flux and said first momentum flux; the influencing, by said second portion of said pressurized fluid, of the direction of said fluid jet wall, includes prevention of excessive turning of said fluid jet wall, generally toward said leading foil edge, so as to be to some degree entrained, in accordance with a Coanda effect, by said second foil surface section.

7. The apparatus for use in association with a fluid foil as recited in claim 2, wherein said fluid foil is one of an airfoil and a hydrofoil.

8. A fluid foil apparatus comprising:
a first foil surface section and a second foil surface section, said first foil surface section having a pressurized fluid inlet, said first foil surface section and said second foil surface section being joined so as to be characterized by a leading foil edge, a trailing foil edge, and a chamber between said first foil surface section and said second foil surface section, said first foil surface section and said second foil surface section being connected at said leading foil edge and forming a gap at said trailing foil edge, said gap extending along at least a portion of said trailing foil edge and communicating with said chamber;
a structure situated in said chamber, said structure including a flat partition section and a bulbous edge section, said flat partition section defining a geometric plane and being characterized by a thickness that is perpendicular to said geometric plane and by a cross-bleed conduit passing through said thickness, said bulbous edge section being characterized by a cylindroid shape and by a diameter that is perpendicular to said geometric plane and that is greater than said thickness, said geometric plane symmetrically dividing said cylindroid shape into two equivalent semi-cylindroid shapes on opposite sides of said geometric plane, said bulbous section unsnugly fitting in said gap so that a first slot and a second slot are formed that are parallel to said geometric plane and so that said geometric plane passes through said gap, said partition section dividing said chamber into a first plenum and a second plenum, said first slot communicating with said first plenum and being demarcated by said first foil surface section and said bulbous edge section, said second slot communicating with said second plenum and being demarcated by said second foil surface section and said bulbous edge section;
at least one support member, said at least support member associating said first foil surface section, said second foil surface section, and said structure, said cross-bleed conduit being located between said trailing foil edge and said at least one support member; and
a pressurized fluid source for feeding pressurized fluid into said first plenum via said pressurized fluid inlet, wherein simultaneously a first portion of said pressurized fluid exits said first plenum through said first slot and a second portion of said pressurized fluid exits said second plenum through said second slot, said first portion of said pressurized fluid flowing unimpeded between said pressurized fluid inlet and said first slot, said second portion of said pressurized fluid entering said second plenum through said cross-bleed conduit and flowing unimpeded between said cross-bleed conduit and said second slot, said cross-bleed conduit thereby determining said second portion of said pressurized fluid.

9. The fluid foil apparatus of claim 8, wherein:
said first portion of said pressurized fluid is characterized by a first momentum flux upon exiting said first plenum through said first slot;
said second portion of said pressurized fluid is characterized by a second momentum flux upon exiting said second plenum through said second slot;
said second momentum flux is less than said first momentum flux.

10. The fluid foil apparatus of claim 9, wherein:
said first portion of said pressurized fluid that has exited said first plenum through said first slot is to some degree entrained in accordance with a Coanda effect by said bulbous edge section, the entrained said first portion of said pressurized fluid thereby forming a fluid jet wall;
said second portion of said pressurized fluid that has exited said second plenum through said second slot influences the direction of said fluid jet wall.

11. The fluid foil apparatus of claim 10, wherein:
said cross-bleed conduit is characterized by a fixed size; said fixed size is associated with a constant ratio of said second momentum flux to said first momentum flux; said constant ratio is no greater than 0.2; said constant ratio is independent of variation of said second momentum flux and said first momentum flux.

12. The fluid foil apparatus of claim 11, wherein the influencing, by said second portion of said pressurized fluid, of the direction of said fluid jet wall, includes limitation of the degree to which said fluid jet wall is entrained by said bulbous edge section.

13. The fluid foil apparatus of claim 10, wherein:
said cross-bleed conduit is characterized by a fixed size; said fixed size is associated with a constant ratio of said second momentum flux to said first momentum flux; said constant ratio is less than 0.05; said constant ratio is independent of variation of said second momentum flux and said first momentum flux; the influencing, by said second portion of said pressurized fluid, of the direction of said fluid jet wall, includes prevention of excessive turning of said fluid jet wall generally toward said leading foil edge so as to be to some degree entrained, in accordance with a Coanda effect, by said second foil surface section.

14. The fluid foil apparatus of claim 10, wherein said structure extends at least substantially the distance between said trailing edge and said leading edge, and wherein said structure lends structural support to the apparatus.

15. The fluid foil apparatus of claim 8, wherein the fluid foil apparatus is one of an airfoil apparatus and a hydrofoil apparatus.

16. A fluid foil apparatus comprising:
a first foil surface section and a second foil surface section, said first foil surface section having a pressurized fluid inlet, said first foil surface section and said second foil surface section being joined so as to be characterized by a leading foil edge, a trailing foil edge, and a chamber between said first foil surface section and said second foil surface section, said first foil surface section and said second foil surface section being connected at said leading foil edge and forming a gap at said trailing foil edge, said gap extending along at least a portion of said trailing foil edge and communicating with said chamber;
a structure situated in said chamber, said structure including a flat partition section and a bulbous edge section, said flat partition section defining a geometric plane and being characterized by a thickness that is perpendicular to said geometric plane, said partition section having a cross-bleed conduit that extends through said thickness, said bulbous edge section being characterized by a cylindroid shape and by a diameter that is perpendicular to said geometric plane and that is greater than said thickness, said geometric plane symmetrically dividing said cylindroid shape into two equivalent semi-cylindroid shapes on opposite sides of said geometric plane, said bulbous section unsnugly fitting in said gap so that a first slot and a second slot are formed that are parallel to said geometric plane and so that said geometric plane passes through said gap, said partition section dividing said chamber into a first plenum and a second plenum, said first slot communicating with said first plenum and being demarcated by said first foil surface section and said bulbous edge section, said second slot communicating with said second plenum and being demarcated by said second foil surface section and said bulbous edge section;
at least one support member, said at least one support member associating said first foil section, said section foil section, and said structure, said cross-bleed conduit being located between said trailing foil edge and said at least one support member;
a pressurized fluid source for feeding pressurized fluid into said first plenum;
a valve for regulating flow of said pressurized fluid into said first plenum;
a controller for controlling said valve so that: said pressurized fluid enters said first plenum via said valve; a first portion of said pressurized fluid entering said first plenum does not enter said second plenum via said cross-bleed conduit; a second portion of said pressurized fluid entering said first plenum enters said second plenum via said cross-bleed conduit; simultaneously, said first portion of said pressurized fluid exits said first plenum through said first slot and said second portion of said pressurized fluid exits said second plenum through said second slot; said first portion of said pressurized fluid is characterized by a first momentum flux upon exiting said first plenum through said first slot; said second portion of said pressurized fluid is characterized by a second momentum flux upon exiting said second plenum through said second slot; said second momentum flux is less than said first momentum flux; said first portion of said pressurized fluid that has exited said first plenum through said first slot is to some degree entrained in accordance with a Coanda effect by said bulbous edge section; the entrained said first portion of said pressurized fluid thereby forms a fluid jet wall; said second portion of said pressurized fluid that has exited said second plenum through said second slot influences the direction of said fluid jet wall.

17. The fluid foil apparatus of claim 16, wherein: the ratio of said second momentum flux to said first momentum flux is related to the size of said cross-bleed conduit; said ratio does not exceed 0.2; the influencing, by said second portion of said pressurized fluid, of the direction of said fluid jet wall, includes limitation of the degree to which said fluid jet wall is entrained by said bulbous edge section.

18. The fluid foil apparatus of claim 16, wherein: the ratio of said second momentum flux to said first momentum flux is related to the size of said cross-bleed conduit; said ratio is less than 0.05; the influencing, by said second portion of said pressurized fluid, of the direction of said fluid jet wall, includes prevention of excessive turning of said fluid jet wall generally toward said leading foil edge so as to be to some degree entrained, in accordance with a Coanda effect, by said second foil surface section.

19. The fluid foil apparatus of claim 4, wherein said structure extends at least substantially the distance between said trailing edge and said leading edge, and wherein said structure lends structural support to the apparatus.

20. The fluid foil apparatus of claim 16, wherein the fluid foil apparatus is one of an airfoil apparatus and a hydrofoil apparatus.

* * * * *